No. 840,383. PATENTED JAN. 1, 1907.
J. SCHMIDT, Jr.
TRANSMISSION GEAR.
APPLICATION FILED DEC. 11, 1903.
5 SHEETS—SHEET 1.
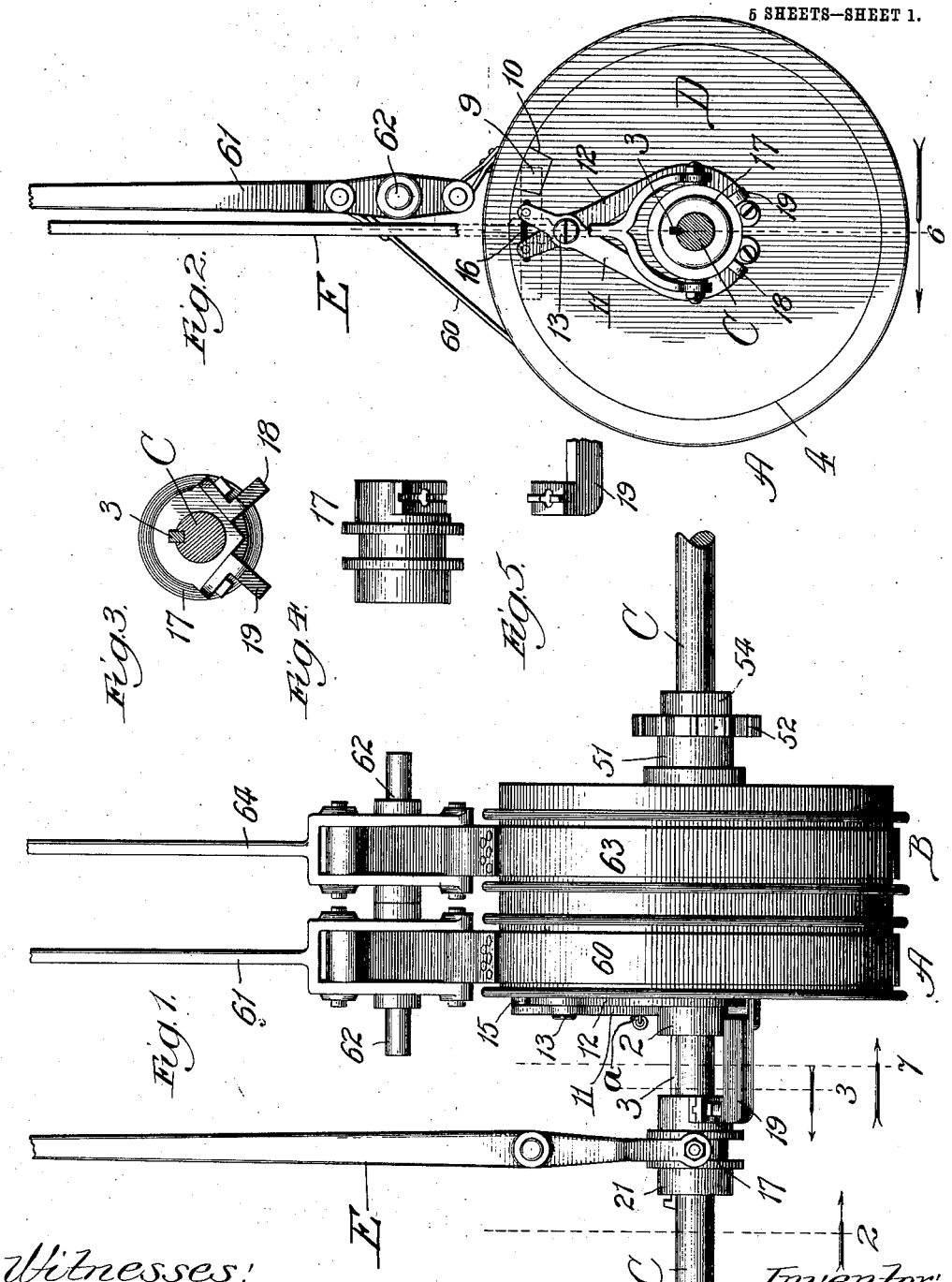

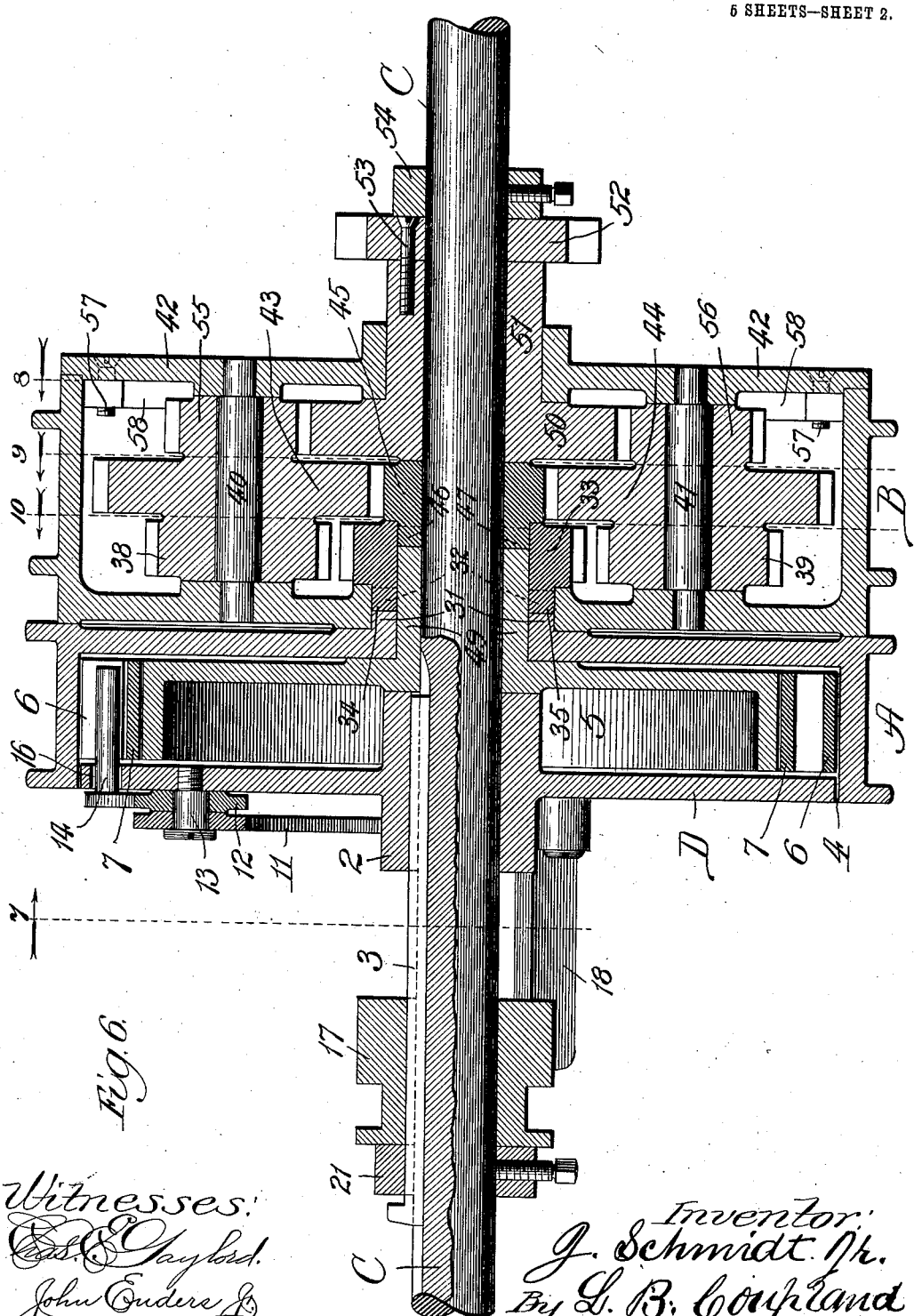

No. 840,383. PATENTED JAN. 1, 1907.
J. SCHMIDT, Jr.
TRANSMISSION GEAR.
APPLICATION FILED DEC. 11, 1903.
5 SHEETS—SHEET 3.
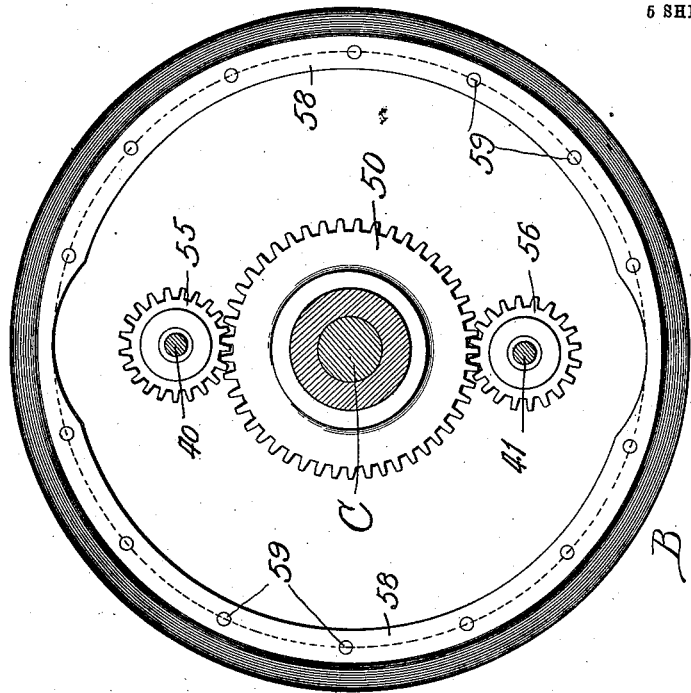
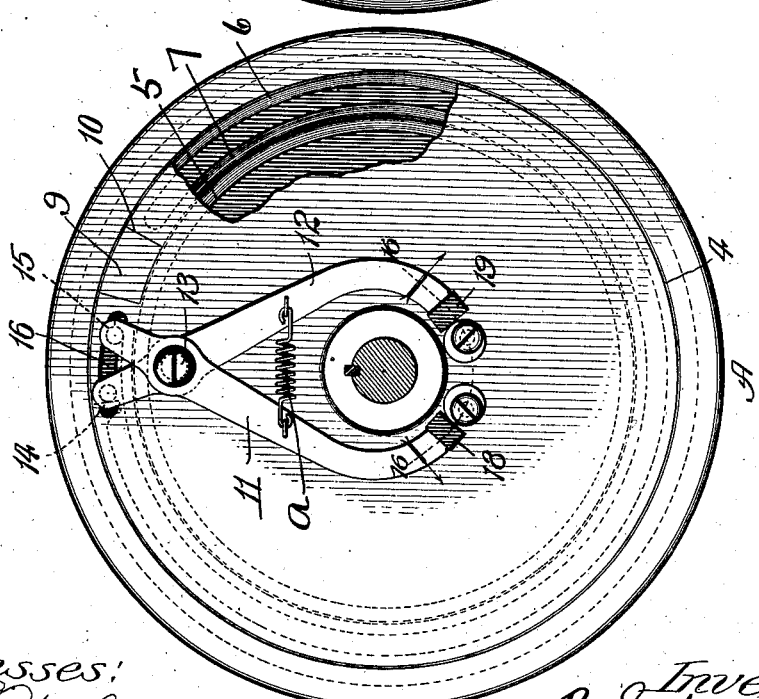
Witnesses:
Inventor,
J. Schmidt Jr.
By L. B. Coupland.
Atty.

No. 840,383. PATENTED JAN. 1, 1907.
J. SCHMIDT, Jr.
TRANSMISSION GEAR.
APPLICATION FILED DEC. 11, 1903.
5 SHEETS—SHEET 4.
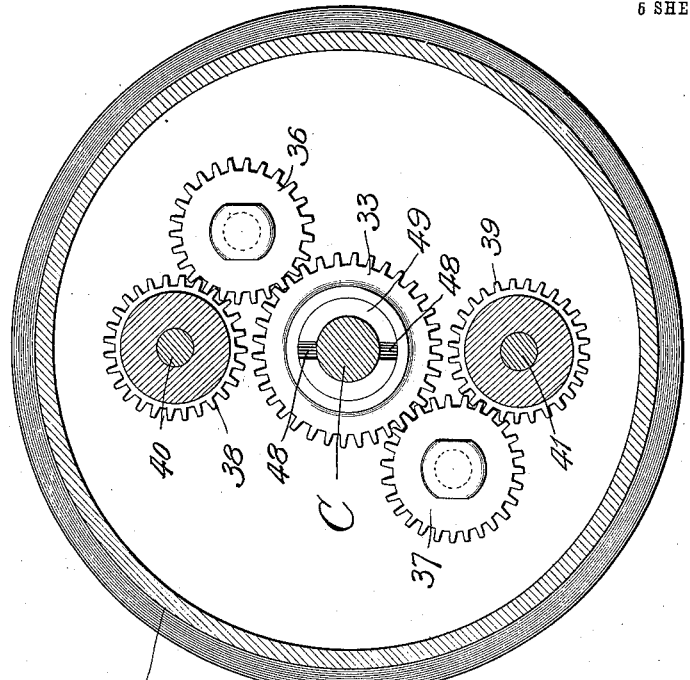
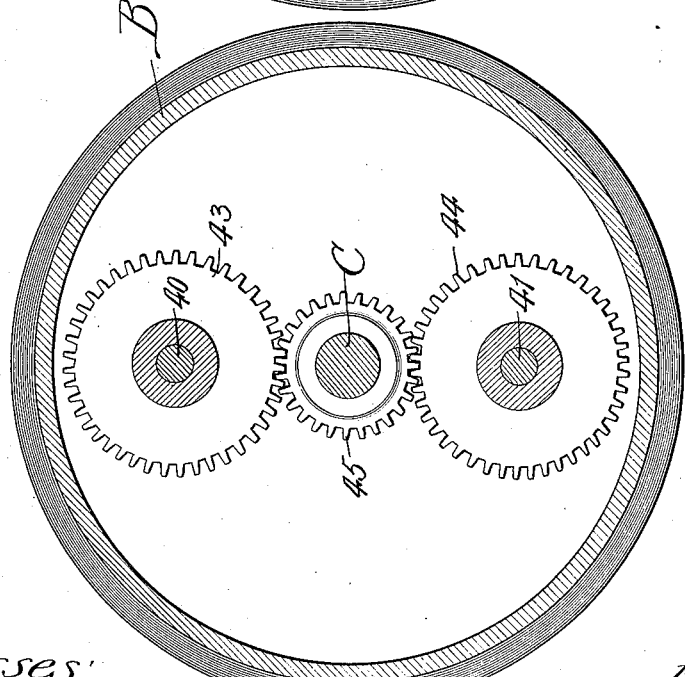
Witnesses:
Inventor
J. Schmidt Jr.
By L. B. Coupland
Atty

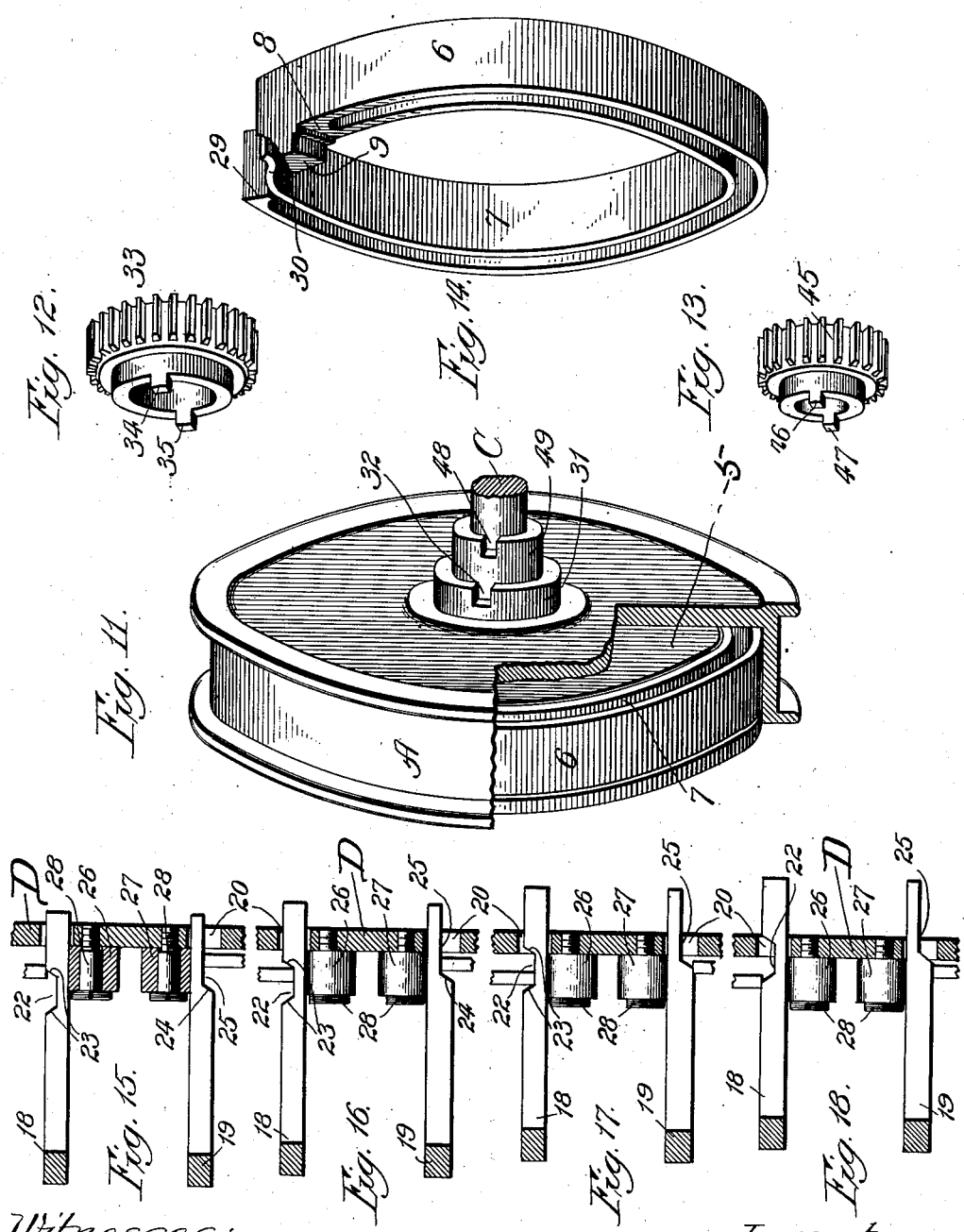

UNITED STATES PATENT OFFICE.

JOSEPH SCHMIDT, JR., OF CHICAGO, ILLINOIS.

TRANSMISSION-GEAR.

No. 840,383.     Specification of Letters Patent.     Patented Jan. 1, 1907.

Application filed December 11, 1903. Serial No. 184,730.

*To all whom it may concern:*

Be it known that I, JOSEPH SCHMIDT, Jr., a citizen of the United States, residing at Chicago, in the county of Cook and State of Illinois, have invented new and useful Improvements in Transmission-Gear, of which the following is a specification.

This invention relates to improvements in that class of differential gear that is more especially adapted for use in connection with automobiles and similar vehicles in transmitting motion and in conveniently controlling and varying the rate of speed, and has for its object to provide a device of this character that is simple and durable in construction, positive and efficient in operation, easily assembled or taken apart with the same facility, and not liable to get out of order.

In the drawings, Figure 1 is an elevation showing the device mounted in its working position. Fig. 2 is an end elevation and transverse section on line 2, Fig. 1, looking in the direction indicated by the arrow. Fig. 3 is a transverse section on line 3, Fig. 1, showing the inner end of the shifting sleeve. Fig. 4 is a detached side elevation of the shifting sleeve. Fig. 5 is a broken-away detail of one of the key-wedges. Fig. 6 is an enlarged vertical longitudinal section on line 6, Fig. 2. Fig. 7 is a transverse section on line 7, Fig. 6. Fig. 8 is a transverse section on line 8, Fig. 6. Fig. 9 is a transverse section on line 9, Fig. 6. Fig. 10 is a transverse section on line 10, Fig. 6. Fig. 11 is a view in perspective of one of the gear-casing members with a portion broken away, showing inclosed mechanism. Figs. 12 and 13 are detached views in perspective of motion-transmitting pinions. Fig. 14 is a view in perspective of a double clutch-ring. Fig. 15 shows the reverse position of the shifting mechanism. Fig. 16 shows the position of rest; Fig. 17, slow speed ahead; and Fig. 18, high speed ahead.

The gear-casing consists of two revoluble members A and B, loosely mounted on a driving shaft or axle C. A disk-plate D is provided with a hub 2 and is rigidly secured on the shaft C by an elongated key 3. This plate is located in the outer open side of the casing A, but is of a less diameter and leaves an annular space 4, so that the adjacent surfaces do not contact. A loosely-mounted friction driving-pulley 5, open on the outer side, is located inside of casing A and is of a less diameter, providing an annular space for the insertion of a double clutch-ring, comprising an outer ring 6 and an inner ring 7, joined together at the closed hub end 8 and free at the open ends, as best shown in Fig. 14. This ring-hub 8 is provided with a lug 9, that is approximately square in cross-section and is adapted to engage an aperture 10 in the plate D, as outlined in Figs. 2 and 7.

The companion expansion clutch-levers 11 and 12 are pivotally joined together by a pin 13, fixed in the plate D. The upper loose ends of these levers are provided with tension-pins 14 and 14, extending inward through a slot-opening 16 in the plate D and across the path of the double clutch-ring. The relative position of the slot 16 and one of the tension-pins is shown in Fig. 6. The pins 14 and 15 are best shown in Fig. 7.

The key 3, securing the plate D on its shaft, is elongated outwardly and retains the clutch-sleeve 17 in its mounted position and provides for both a rotary and an endwise-shifting movement thereof in actuating the clutch mechanism. The outer ends of companion key-wedges 18 and 19, Fig. 3, are rigidly secured to the clutch-sleeve 17, the inner free ends extending through apertures 20 in plate D into the space in driving-pulley 5. The diagrammatic views in Figs. 15, 16, 17, and 18 show the different positions of the key-wedges relative to the expansion-levers contacting the same and controlled by the actuating hand-lever E. Fig. 15 indicates the relative position of the expansion-levers and key-wedges 18 and 19 on a slow forward movement. Fig. 16 indicates the normal position, the casing members being at rest. Fig. 17 shows the reverse position, and Fig. 18 high speed forward. The key-wedge 18 is provided with a notch 22, in which the lower end of expansion-lever 11 rests when in its normal disengaged position. This notch is provided with sloping side walls 23, so as to ease the longitudinal movement of the engaging key-wedge 18. The companion lever 12 is cut away from the inner free end outward to a sloping shoulder 24, reducing the thickness of the same to about one-half, and presents a flat surface 25 to the lower curved end of lever 12, thus providing a high and low part for the different positions of the expansion-levers in varying the speed and changing the direction of motion.

The movable cam-rollers 26 and 27 are secured in place by screws 28, which thread into plate D. The function of these rollers is to compensate for the wear on the key-wedges and prevent lost motion, which is done by slacking back on the holding-screws and rolling a higher part of the cam-surface into a bearing position on the companion key-wedges.

It will be noted that the expansion-levers 11 and 12 lie in different planes, so that one may rest on the low part and the companion lever on the high-part of the key-wedges or both rest on either the high or low parts in expanding one clutch-ring at a time or both simultaneously. When the lever 11 is expanded, the tension-pin 14 comes in contact with the free end 29 of the outer friction clutch-ring 6, Fig. 14, and forces the same outward into contact with the inner circumferential surface of the casing member A, the companion pin 15 being adapted to contact the free end 30 of the inner clutch-ring 7 and force the same inward into frictional contact with the outer surface of the driving-pulley 5 in transmitting the required rotary motion to the casing members.

The hub 31 of casing member A, extending inside of casing B, Figs. 6 and 11, is provided on opposite sides with recesses 32. A gear 33, Fig. 12, is provided with locking-teeth 34 and 35, engaging said recesses, as best shown in Fig. 6. The companion pinions 36 and 37, Fig. 10, are provided with suitable mountings in the inner wall of casing B and are positioned opposite to each other on a line diagonal to a vertical line through the driving-shaft. These pinions are engaged by the gear 33 and in turn engage pinions 38 and 39, loosely mounted on stationary spindles 40 and 41, having their inner ends fixed in the inner wall of casing B and their outer ends in a cap 42, closing the outer side of casing member B. A gear 43 is loosely mounted on spindle 40 and a companion gear 44 mounted on spindle 41. These gears are engaged by an intermediate pinion 45, Figs. 6, 9, and 13, loosely mounted on the driving-shaft and provided with locking teeth 46 and 47, adapted to engage corresponding recesses 48, formed in the inner end and on opposite sides of the hub extension 49 of the driving-pulley 5, Figs. 6 and 11.

A gear 50 is loosely mounted on the driving-shaft and is provided with an elongated hub 51, extending outwardly through the cap 42. A sprocket 52 is mounted on the driving-shaft and is rigidly secured to the end of hub 51 by a number of screws 53. A retaining-collar 54 prevents an endwise movement of these parts. The gear 50 engages companion pinions 55 and 56, Figs. 6 and 8, located opposite to each other and loosely mounted on spindles 40 and 41. It will be understood that each set of gear and pinions mounted on the spindles 40 and 41 are formed integral and all rotate simultaneously.

The cap 42, closing the outer side of casing B, is removably secured in place by a number of screws 57, engaging an annular rim 58, formed on the inner side of the casing, the screw-holes 59 in the rim being shown in Fig. 8. A friction brake-band 60 encircles the casing A and has its respective ends operatively secured to a manipulating-lever 61, supported on a shaft 62. A companion brake-band 63 encircles casing B and has its respective ends connected with a hand-lever 64, also supported on shaft 63. The brake-band 63 on the casing member B is intended for general use and is ordinarily sufficient. The band 60 on the casing member A is intended as an emergency auxiliary brake in quickly checking a high speed in avoiding accidents.

In practical working the expansion-levers and key-wedges are shown in their slow-forward position. In this position the lower end of expansion-lever 11 rests on the high part of key-wedge 18, which has the effect of contracting clutch-ring 7 and draws the same inward into frictional contact with the driving-pulley 5 and imparts a slow forward or go-ahead movement. The casing member B is held stationary at this time by the use of its brake-band. In Fig. 16 the levers 11 and 12 are shown in their normal contracted position, the lower ends resting on the low parts of the actuating key-wedges and the casing members at rest. The reverse or backing position is shown in Fig. 17, the lower engaging end of lever 12 resting on the high part of key-wedge 19, which has the effect of moving the upper end outward and brings the pin 14, carried thereby, in contact with the free end of clutch-ring 6 and expands the same into frictional contact with the inner circumferential surface of the casing member A and imparts the reverse motion thereto. Fig. 18 shows the high-speed-ahead engagement, the key-wedges being forced inward to their limit, the lower ends of both the levers 11 and 12 bearing on the high part thereof and both friction-rings 6 and 7 engaged and both brake-bands released. In this arrangement the key-wedges are shifted to their different positions in transmitting a slow forward, a high-speed forward, and reverse by means of the actuating hand-lever E. When the friction driving-pulley 5 and the inside clutch-ring 7 are in engagement on slow speed ahead, the casing member A is an idler. In backing the casing member A turns ahead with the outside plate D. The casing member B is at rest when backing and also in slow speed forward. When backing, the friction-pulley 5 is an idler.

Having thus described my invention, what I claim is—

1. In transmission-gear, a driving-shaft, the casing members loosely mounted thereon and having motion independent of each other, one of said casing members having a hub extending into the other member, a friction driving-drum loosely mounted on said shaft and also provided with a hub extension entering the adjacent member, the system of motion-transmission gears intermediate thereto, and the operative brake mechanism.

2. In transmission-gear, a revoluble shaft, the casing members loosely mounted thereon and having an independent rotary movement, a disk plate rigidly mounted on said shaft, a friction driving-drum of a less diameter than the surrounding casing and leaving an annular space therebetween, the clutch-rings located in said space, means for actuating said clutch-rings, and the operative connections with said casing members.

3. In transmission-gear, a revoluble shaft, a clutch-sleeve mounted thereon and having both a rotary and an endwise-sliding movement, the companion key-wedges secured to said sleeve, a disk plate, the clutch-rings, a driving-drum, the companion clutch-levers pivoted to said disk plate and having their lower ends in contact with said wedges and their upper ends provided with pins operatively engaging the clutch-rings, the casing members and the intermediate gear mechanism for transmitting motion.

4. In transmission-gear, a revoluble shaft, the casing members loosely mounted thereon, a clutch-sleeve feathered on said shaft, means for manually imparting an endwise movement to the clutch-sleeve, the key-wedges secured to the latter, the crossed clutch-levers, a disk plate, a driving-pulley, the clutch-rings, the solid gear-driving mechanism, the spindles on which the same is mounted, the gear 50 and the sprocket-wheel secured to the hub thereof.

In testimony whereof I have signed my name to this specification in the presence of two subscribing witnesses.

JOSEPH SCHMIDT, JR.

Witnesses:
G. E. CHURCH,
L. B. COUPLAND.